(12) United States Patent
Billiet (10) Patent No.: US 9,480,945 B2
(45) Date of Patent: Nov. 1, 2016

(54) PRESSURE SWING ADSORPTION APPARATUS

(71) Applicant: Nano-Porous Solutions Limited, Tyne and Wear (GB)

(72) Inventor: Colin Billiet, Tyne and Wear (GB)

(73) Assignee: NANO-PURIFICATION SOLUTIONS LTD (GB)

(*) Notice: Subject to any disclaimer, the term of this patent is extended or adjusted under 35 U.S.C. 154(b) by 0 days.

(21) Appl. No.: 14/436,044

(22) PCT Filed: Oct. 16, 2013

(86) PCT No.: PCT/GB2013/052695
§ 371 (c)(1),
(2) Date: Apr. 15, 2015

(87) PCT Pub. No.: WO2014/060746
PCT Pub. Date: Apr. 24, 2014

(65) Prior Publication Data
US 2015/0251126 A1    Sep. 10, 2015

(30) Foreign Application Priority Data

Oct. 16, 2012  (GB) .................................. 1218551.8

(51) Int. Cl.
*B01D 53/047* (2006.01)
*F16K 7/07* (2006.01)
(Continued)

(52) U.S. Cl.
CPC ........... *B01D 53/047* (2013.01); *B01D 53/261* (2013.01); *F16K 7/075* (2013.01);
(Continued)

(58) Field of Classification Search
CPC ............ B01D 53/047; B01D 53/0446; B01D 53/261; B01D 2256/10; B01D 2257/80; B01D 2257/104; B01D 2259/40003; B01D 2259/40011; F16K 7/075
USPC ........................................... 96/121; 251/4, 5
See application file for complete search history.

(56) References Cited

U.S. PATENT DOCUMENTS 4,083,375 A    4/1978  Johnson
4,451,023 A    5/1984  Zakai
(Continued)

FOREIGN PATENT DOCUMENTS

EP          0253064        1/1988
JP     2008-229493 A  *  2/2008

OTHER PUBLICATIONS

International Search Report from corresponding PCT/GB2013/052695, mailed Dec. 20, 2013.

*Primary Examiner* — Frank Lawrence
(74) *Attorney, Agent, or Firm* — The Belles Group, P.C.

(57) ABSTRACT

A pressure swing adsorption apparatus for treatment of gases is disclosed. It includes a main inlet for receiving a flow of gas and one or more adsorption columns containing adsorption material. The columns are connected by a channel and the channel has an annular recess therein to receive a valve. The valve includes a support member formed from a pair of truncated cones and having slots extending therethrough. The valve also has a tubular membrane that surrounds the support member and is movable, in response to pneumatic pressure applied to the membrane, between a first position in which the membrane does not block the slots thereby allowing the gases to flow and a second position in which the membrane blocks the slots thereby preventing said gases from flowing through the valve.

9 Claims, 9 Drawing Sheets

(51) Int. Cl.
  *B01D 53/26* (2006.01)
  *B01D 53/04* (2006.01)

(52) U.S. Cl.
  CPC ....... *B01D53/0446* (2013.01); *B01D 2256/10* (2013.01); *B01D 2257/104* (2013.01); *B01D 2257/80* (2013.01); *B01D 2259/40003* (2013.01); *B01D 2259/40011* (2013.01)

(56) References Cited

U.S. PATENT DOCUMENTS

| | | | |
|---|---|---|---|
| 4,925,153 A | | 5/1990 | Romer |
| 4,927,434 A | * | 5/1990 | Cordes ............... B01D 53/0454 95/15 |
| 5,000,214 A | | 3/1991 | Pelkey |
| 5,036,879 A | * | 8/1991 | Ponci ...................... F16K 7/075 137/496 |
| 5,827,358 A | * | 10/1998 | Kulish ............... B01D 53/0407 96/115 |
| 7,665,713 B1 | | 2/2010 | Clark |
| 2004/0163534 A1 | | 8/2004 | Lomax et al. |
| 2005/0072423 A1 | * | 4/2005 | Deane ............... B01D 53/0407 128/202.26 |
| 2006/0230931 A1 | * | 10/2006 | Bliss ............... B01D 53/0407 95/130 |
| 2011/0297478 A1 | | 12/2011 | Billiet et al. |

* cited by examiner

PRESSURE SWING ADSORPTION APPARATUS

CROSS-REFERENCE TO RELATED PATENT APPLICATIONS

The present application is a U.S. national stage application under 35 U.S.C. §371 of PCT Application No. PCT/GB2013/052695, filed Oct. 16, 2013, which in turn claims priority to U.K. Application No. 1218551.8, filed Oct. 16, 2012, the entireties of which are incorporated herein by reference.

The present invention relates to a pressure swing adsorption apparatus and relates particularly, but not exclusively, to a multi-column pressure swing adsorption system for drying compressed air or for nitrogen generation.

Pressure swing adsorption techniques are well known and are used for example in the drying of compressed air or the generation of gases.

Adsorption is a process whereby specific molecules (the adsorbate) adhere to the surface of a highly porous solid (the adsorbent) by electrostatic and molecular forces. The adsorbent has a specific pore structure which will be a combination of larger or macro pores, slightly smaller pores or mesopores, or very small pores known as micro pores. The adsorbent is normally made into granules or beads which are used to form packed beds through which the adsorbate is passed and the process of adsorption can take place. The rate of adsorption is affected by many factors which ultimately determine the adsorption isotherm profile which in turn determines the size of the packed bed required.

Desiccant adsorption dryers are used in the drying of compressed air or other gases where high purity with Pressure Dew Points of −70° C., −40° C. and −20° C. are required. These Pressure Dew Points are set according to ISO8573.1 as humidity classes 1, 2 and 3 respectively.

Figure 1:
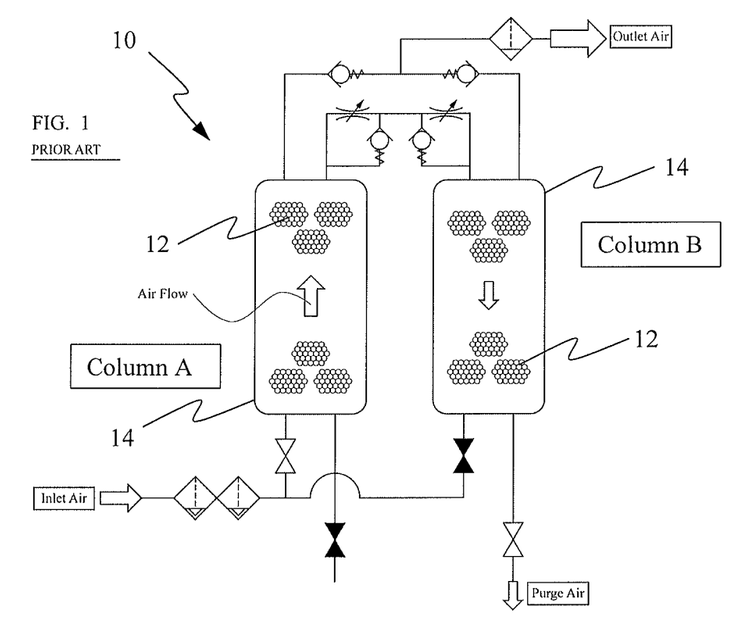
FIG. 1 is a schematic representation of a pressure swing adsorption apparatus of the prior art.

Heatless Pressure Swing Adsorption (PSA) desiccant dryers are the most common due to their simplicity and hence low cost. A schematic example of a heatless twin tower dryer (10) is shown in FIG. 1. It operates by removing moisture through adsorption onto a granular desiccant bed (12) from the feed air (typically at 7 barg) as it flows up through a packed bed of desiccant, column A. Column B (having been previously used in drying the inlet air) is at atmospheric pressure and dry purge air from the outlet of column A is fed through a control orifice/valve, expanded to near atmospheric pressure, and flows in contra flow direction down through column B. This effects the regeneration of the granular desiccant bed by removal of the adsorbed moisture into the reduced pressure dry air. When the desiccant in column A becomes saturated with water vapour (usually determined by a simple timer controller) the feed air is switched back to column B, after it has been pressurised, and the cycle continues.

The production of nitrogen gas from a compressed air source is also well known. By employing selected one or more Carbon Molecular Sieves (CMS) and utilising the Pressure Swing Adsorption technology, described above, this enables the supply of various purities of nitrogen to be produced by the user on site from compressed air. Molecular adsorption takes place as the compressed air passes through a column of CMS where oxygen is preferentially adsorbed into its porous structure resulting in an outlet stream of nitrogen gas to a desired purity.

A twin tower PSA nitrogen generator (10), described again with reference to FIG. 1, operates by removing oxygen through molecular adsorption onto a bed of granular CMS (12) from the feed air (typically at 7-10 barg) as it flows up through a packed bed of CMS, column A. Column B (having been previously used) is depressurised and oxygen released from the CMS due to the expansion of the gas within the bed. Depleted oxygen purge gas from the outlet of column A is fed through a control orifice, expanded to near atmospheric pressure, and flowed in a contra flow direction down through column B to sweep the bed clear of concentrated oxygen. The cycle of operation is set to achieve the desired output purity of the nitrogen outlet stream. When the CMS in column A becomes saturated with oxygen (usually determined by a simple timer controller) the feed air is switched back to column B, after it has been pressurised, and the cycle continues.

The prior art shown schematically in FIG. 1 depicts a PSA absorber design where the columns are made from welded steel tanks (14). The valves used for air/gas management are usually proprietary individual valves fitted into the pipework by threaded or flanged fittings.

While such designs are still in common use some others using extruded aluminium of a modular design have also been in the market for many years. The advantages of modular construction are claimed to include flexibility in manufacture, compactness, commonality of parts and ease of maintenance among others. Such designs have evolved to use purpose built valves to maintain the compactness of the designs. The valves are specifically designed to bolt onto the ends of the common manifolds to manage the flow of air/gas through the system. The valves are designed to be common across a range of capacities where such capacities are varied depending on the number of columns used.

Figure 2:
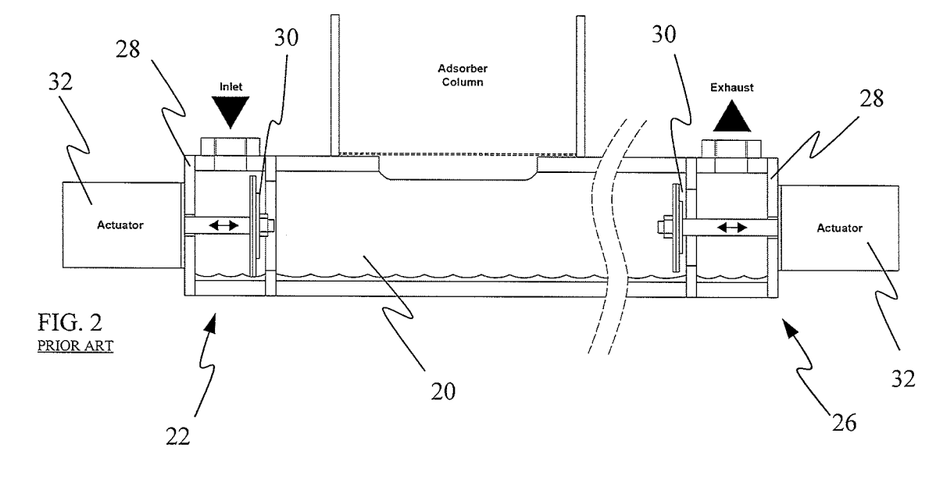
FIG. 2 is a schematic sectional view of a portion of an apparatus of the prior art.
Figure 3:
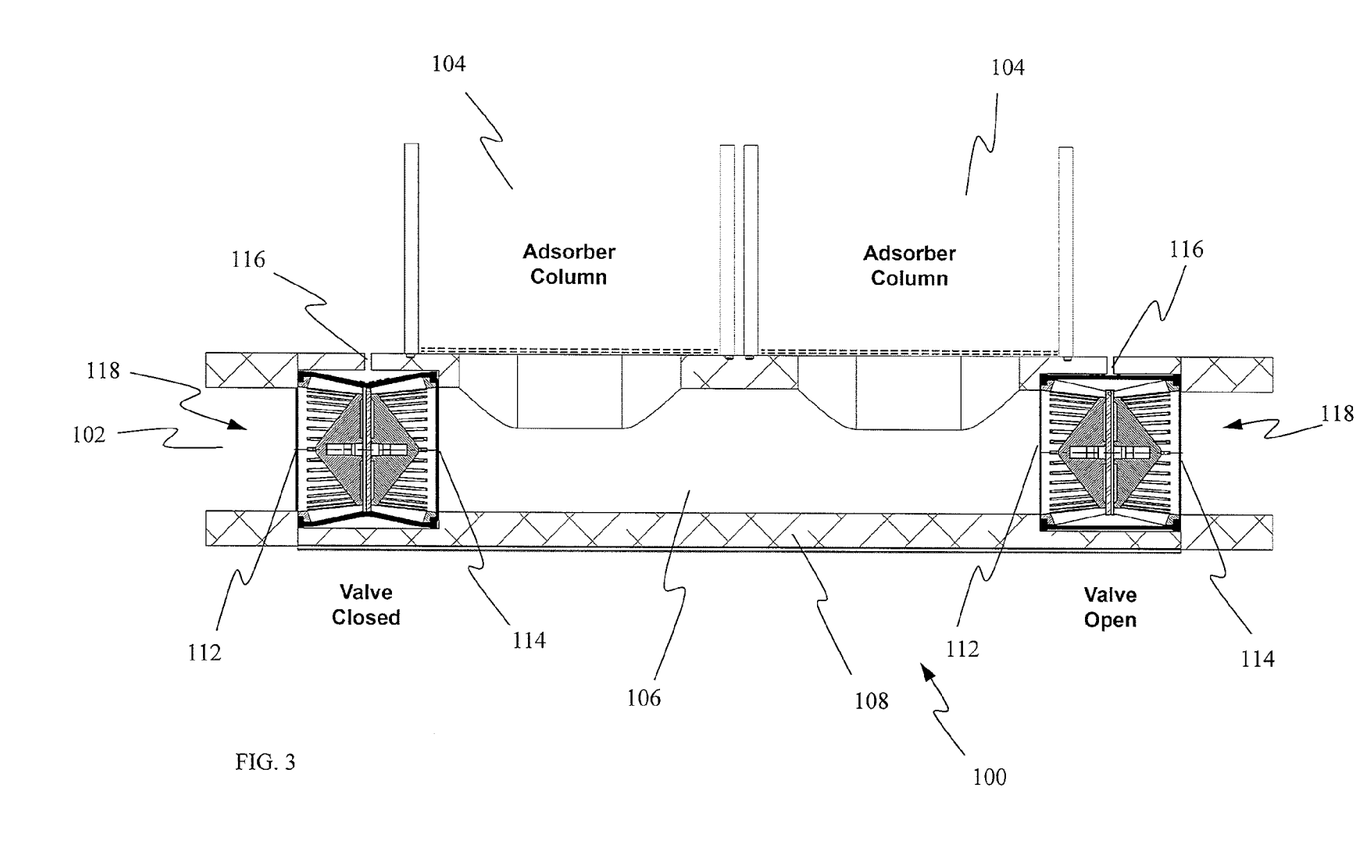
FIG. 3 is a sectional view of an apparatus of a first embodiment of the present invention.
Figure 4:
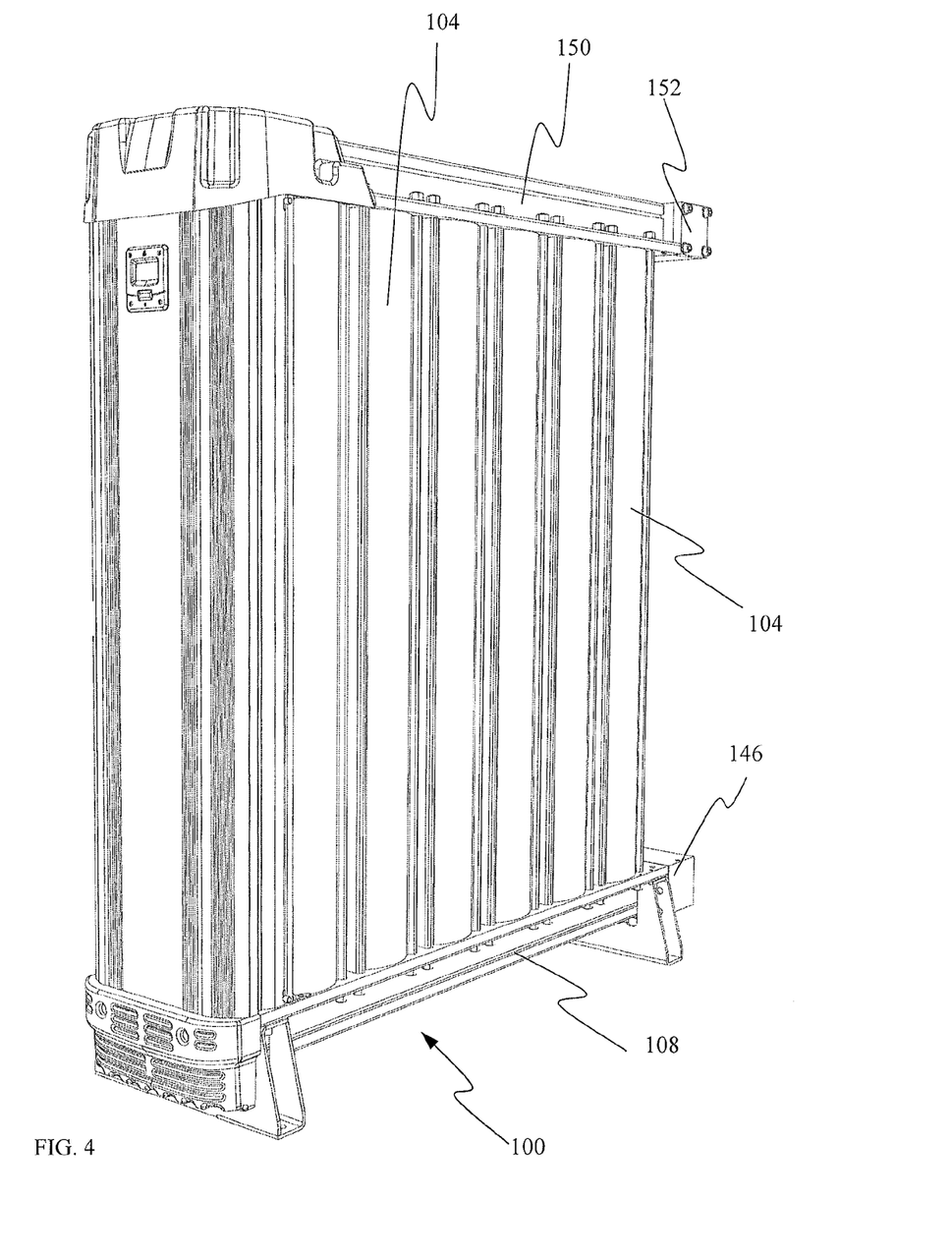
FIG. 4 is a perspective view of an apparatus of a second embodiment of the present invention.
Figure 5:
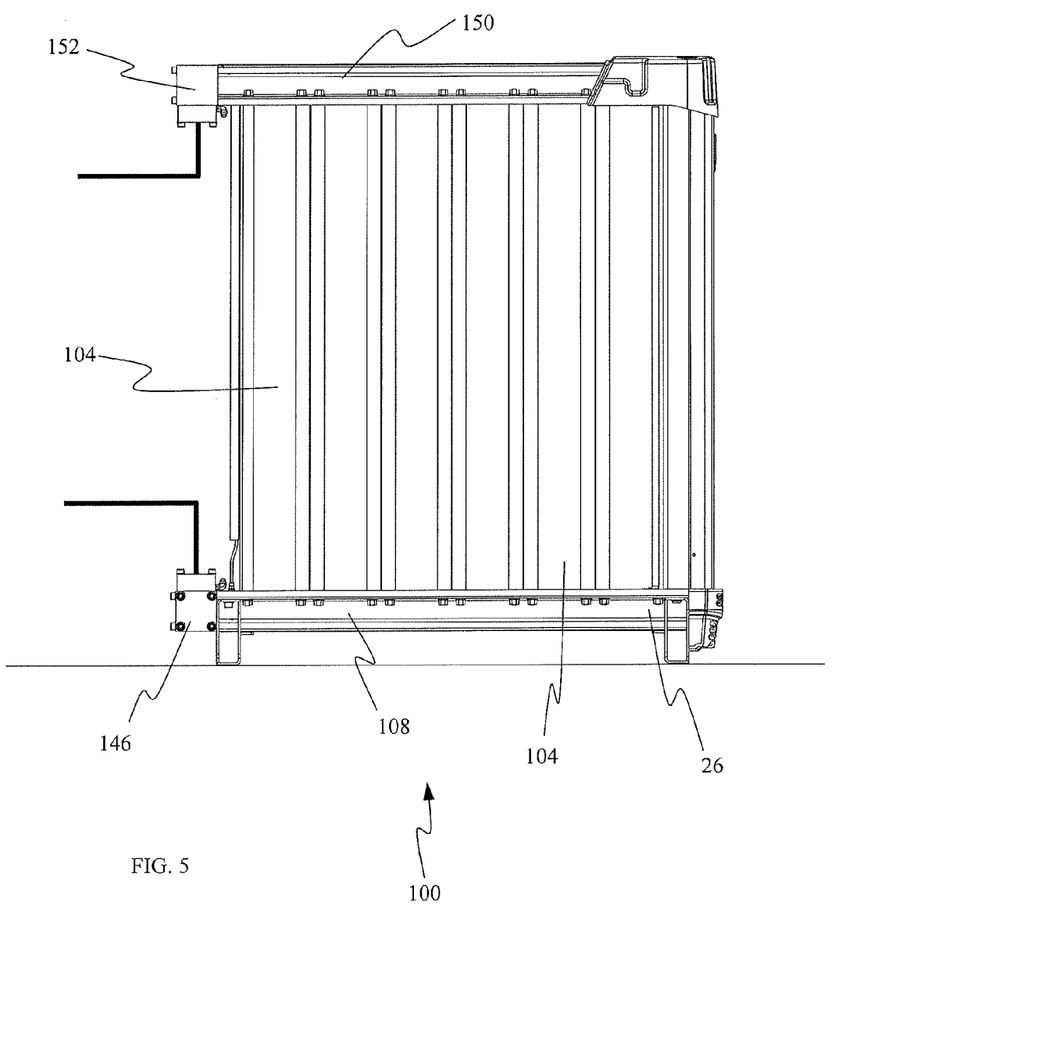
FIG. 5 is a side view of an apparatus of the apparatus of FIG. 4.

FIG. 2 shows the typical design of the valves which may be used for the management of the inlet air flow and the exhaust air flow. A valve body (28) is bolted onto the end of the manifold (20) and disc valves (30) operated by pneumatic actuators (pistons 32) which position the valve into the desired position to open or close such valves. The pneumatic actuators (32) are operated using a pilot valve (not shown) which is controlled by a PLC or other control means.

Such designs are very reliable but they do have a number of disadvantages including cost due to the overall design containing numerous components. It also has a limited service life with valve discs requiring regular maintenance and service costs are high since most of the assembly requires changing. Furthermore, pressure losses are significant due to the torturous path of the air/gas and the design allows a dead zone where condensed water will collect.

Preferred embodiments of the present invention seek to overcome the above described disadvantages of the prior art.

According to the present invention there is provided a pressure swing adsorption apparatus for treatment of gases, the apparatus comprising:

at least one apparatus inlet for receiving a flow of gas;

at least one adsorption column containing at least one adsorption material for adsorbing at least one component of said gas passing therethrough;

at least one channel connecting at least one said apparatus inlet to at least one said adsorption column such that said flow of gas can pass from said inlet to said column, said channel having at least one recess therein and said recess having at least one recess inlet, at least one recess outlet and at least one valve control inlet; and at least one valve located between said recess inlet and said recess outlet, the valve including:

at least one support member having at least one aperture extending therethrough; and at least one tubular membrane substantially surrounding said support member, said membrane movable, in response to fluid pressure applied to said membrane through said valve control inlet, between a first position in which said membrane does not block said apertures of said support thereby allowing said gases to flow from said recess inlet to said recess outlet and a second position in which said membrane blocks said apertures of said support thereby preventing said gases from flowing from said recess inlet to said recess outlet.

By providing a pressure swing adsorption apparatus that includes a channel into which a recess is formed and into which in turn a valve formed from a support member and tubular membrane is inserted offers the following advantages. The moving components of a valve of the type set out above are very few in number and inexpensive to produce. As a result, the cost of production of the valve is low and in particular the maintenance costs are very low because servicing of a valve of this type formed integrally into the channel and that can join an array of parallel columns, is particularly easy. All that is required is the removal of a retaining plate and the replacement of the support member and tubular membrane in the recess formed in the channel. Furthermore, because the valve sits in a recess in the channel, the valve can be easily produced so as to provide no obstacle to the flow of any water which can puddle in the channel during the purge cycle of the pressure swing adsorption apparatus.

In a preferred embodiment, the adsorption material comprises at least one adsorbent for adsorbing water from said gas.

In another preferred embodiment, the adsorption material comprises at least one adsorbent for adsorbing oxygen from said gas.

In a further preferred embodiment, the channel comprises a substantially tubular member formed by extrusion.

In a preferred embodiment, the recess is machined into said channel.

In another preferred embodiment, the recess is substantially annular.

By providing an annular recess that is machined into an extruded channel, the advantage is provided that a very effective valve can be provided in a very cost efficient manner. In particular, because the recess is machined into an extruded channel, the accuracy of extrusion is not particularly important because this part of the channel only acts to direct the fluid flow. However, the recess, which acts as the seat for the valve, must be formed with significant precision in order to ensure that the valve is provided with a good seal. This is easily achieved by machining the recess into the extruded channel.

In a preferred embodiment, the support member comprises a pair of frustoconical members engaged with each other and said apertures in said support members extending through curved surfaces of said frustoconical members.

In another preferred embodiment, the apertures are in the form of slots.

In a further preferred embodiment, the membrane has a thickness substantially equal to the depth of said recess relative to said channel.

By making the depth of the recess equivalent to the thickness of the membrane, the advantage is provided that this ensures the easiest path for movement of fluid, in particular liquid water, along the channel, through the valve and out of an exhaust. This in turn prevents puddling of water in the apparatus which causes operational problems.

Preferred embodiments of the present invention will now be described, by way of example only, and not in any limitative sense, with reference to the accompanying drawings in which.

Referring to FIGS. 3 to 10, a pressure swing adsorption apparatus 100 for the treatment of gases is used for moisture removal from a stream of gas, or gas generation, for example nitrogen generation, by removal of oxygen using a carbon molecular sieve, amongst other gas treatment techniques. The apparatus includes an apparatus or main inlet 102 into which a flow or stream of gas is received, typically from a pump under pressure. The apparatus 100 also includes at least one and generally multiple pairs of adsorption columns 104. The examples shown in FIG. 3 to are dual column PSA devices. The apparatus 100 shown schematically in FIG. 3 has two pairs of adsorption columns 104, whereas the example shown in FIGS. 4 to 6 includes six pairs of columns. Each adsorption column 104 contains at least one adsorption material for absorbing at least one component of the stream of gas passing therethrough. These adsorption materials may be in the form of a granular or bead material or in the form of a series of tubes of the adsorption material. Examples of adsorption materials include molecular sieves, activated alumina, silica gel and carbon molecular sieves, amongst others.

The apparatus also includes a channel 106 that is formed in extrusion 108. The channel 106 provides a connection between the main inlet 102 and the adsorption column 104 through which the flow of gas can pass. The channel includes at least one, and in the example shown in FIGS. 7 to 8 two, recesses 110 that are machined into channel 106 of extrusion 108. Because it sits below the pairs of columns 104 providing a stream of air to the left or right sets of the column pairs, extrusion 108 contains two channels 106, one for the left-hand columns and one for the right-hand columns. The recess 110 includes a recess inlet 112 at one end of the recess, a recess outlet 114 at the other end of the recess and a valve control inlet 116 that extends through the wall of extrusion 108 between the recess inlet and outlet 112 and 114.

Figure 7:
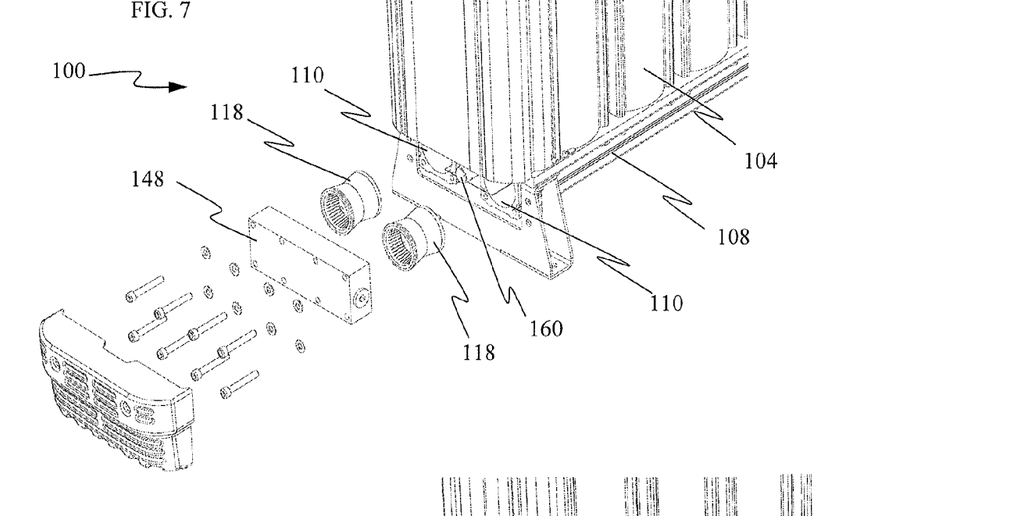
FIG. 7 is an exploded sectional view of a portion of the apparatus of FIG. 6.
Figure 8:
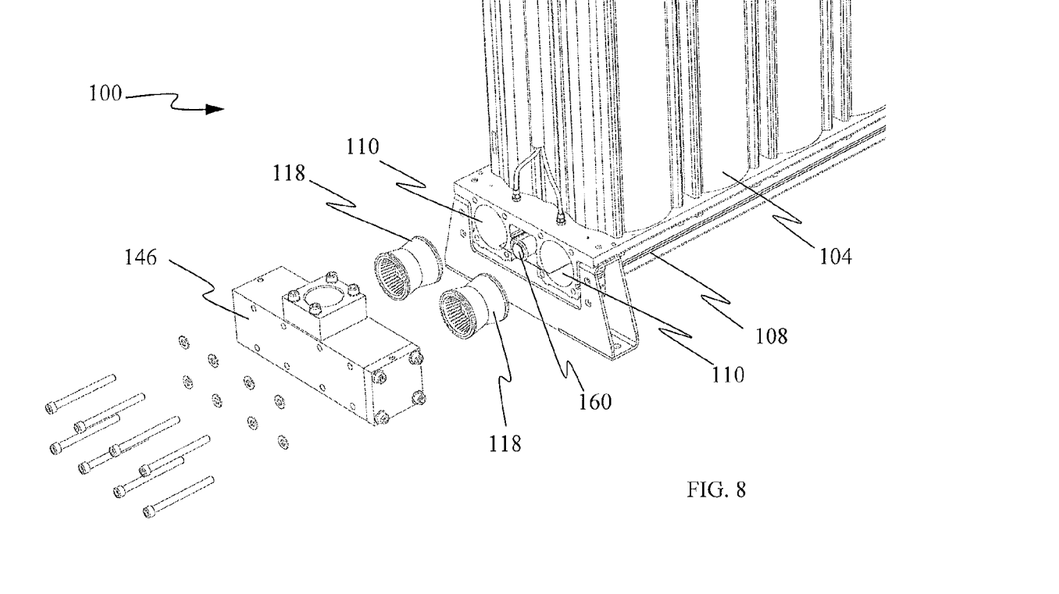
FIG. 8 is an exploded sectional view of another portion of the apparatus of FIG. 6.
Figure 9A:
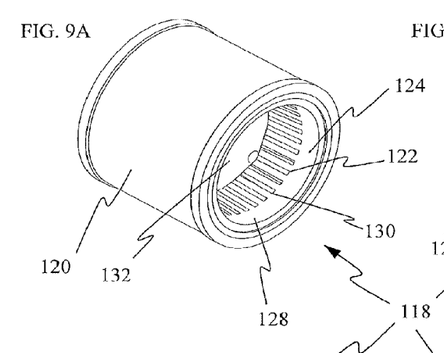
FIGS. 9A to 9F are perspective, perspective sectional and plan sectional views, in open and closed positions, of the valve used in the apparatus of FIGS. 5 to 8.
Figure 9B:
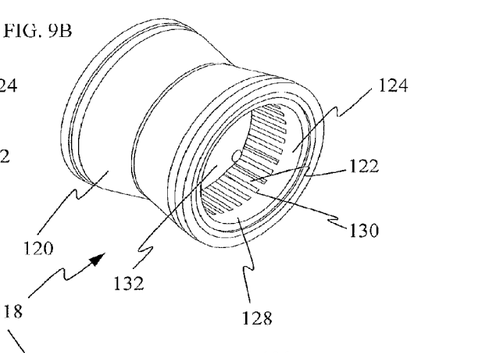
Figures 9C, 9D:
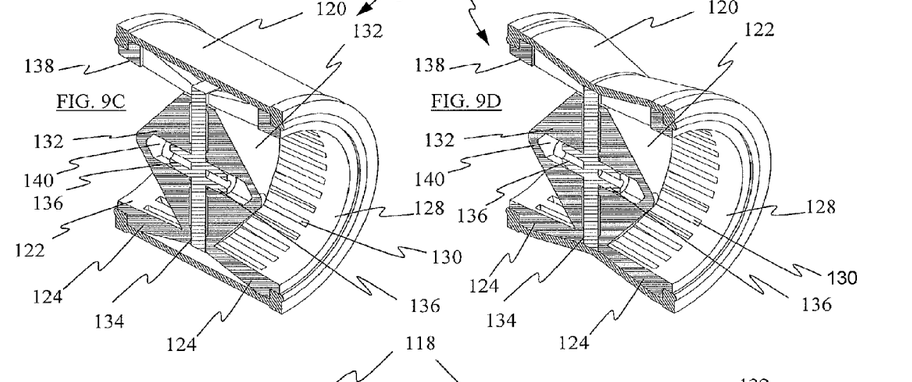
Figures 9E, 9F:
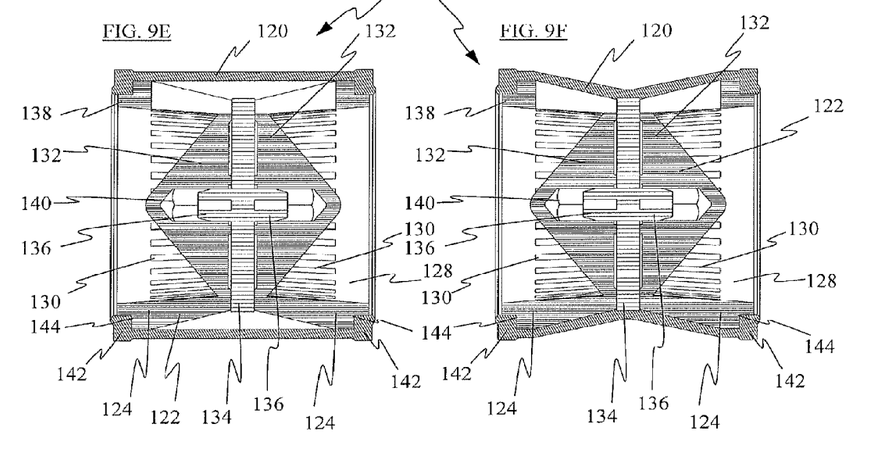

Set within recess 110 is a valve 118 which comprises two components in the form of a tubular membrane 120 and a support portion 122.

With particular reference to FIG. 9, the support portion 122 is in the form of a pair of truncated hollow cones 124 that are joined at their smaller ends by a solid connecting central portion 126 which is itself a truncated cone 132. The curved surfaces 128 of cones 124 have slot shaped apertures 130 extending therethrough, the central portion 126 does not have any such apertures. As a result, when the support portion 122 is located within the tubular recess 110 a stream or flow of gas is able to pass through the support and into channel 106. The path that the flow of gas takes is to enter the truncated cone through the base and to pass through the slot apertures 130, thereby passing into the space between the outer surface of the cone and the wall of the recess. The path then takes the gases through the apertures 130 in the outer surface of the other cone before passing through the recess outlet 114 and into channel 106. The truncated cones 132 of central portion 126 help direct the air streams to the slots 130. The slots are sized so that the outer end of the slot, that is the end away from cones 132 on central portion 126, is approximately in line with the inner surface of membrane 120, so as to aid flow of water, which occasionally condenses in the channel 106, through the valve and out. This prevents puddling of the water in the channel.

The support portion is formed in three parts. A central disk 134 (which is only visible in the sectional views of FIG. 9) has a pair of support studs 136 extending perpendicularly from the centre of each side of the disk. The remainder of support 122 is formed from a pair of identical support bodies 138 that include the truncated cones 124 and 132 as well as a stud recess 140. Support 122 is constructed by simply pressing the support bodies 138 onto the disk 134 such that the studs 136 enter stud recesses 140.

The tubular membrane 120 fits around support portion 122 and is formed from a flexible material such as nitrile rubber. The membrane 120 is sufficiently flexible that it can move from a rest condition to a tensioned condition. In the rest condition, in which the valve is open to the transfer of gas therethrough, the inner surface of the membrane 120 engages the support 122. However, the pressure of gas entering the valve is easily sufficient to push the membrane away from the support 122 as it passes through slots 130 so as to press the outer surface of the tubular membrane so that it engages or is in close proximity to the inner surface of recess 110 (see FIGS. 9A, 9C and 9E). In the tensioned condition, in which the valve is closed to the transfer of gas therethrough, the inner surface of the tubular membrane engages the outer surfaces of cones 124 of support portion 122 so as to block apertures 130 (see FIGS. 9B, 9D and 9F) and is held in this position by the application of pneumatic pressure through valve control inlet 116. The membrane has a retaining ridge 142 at each end that fits into a respective retaining recess 144 in the outermost edge of each end of support 122.

The apparatus 100 also includes inlet and exhaust blocks 146 and 148 that, amongst other functions, retain the valves 118 in the recesses 110 of extrusion 108 that in use is located below the columns 104. The inlet block 146 is located adjacent the valves 118 that control inflow of air into the apparatus and exhaust end block 148 is located adjacent the valves 118 that control the exhausting of purged air as it flows back through the columns 104.

Figure 10A:
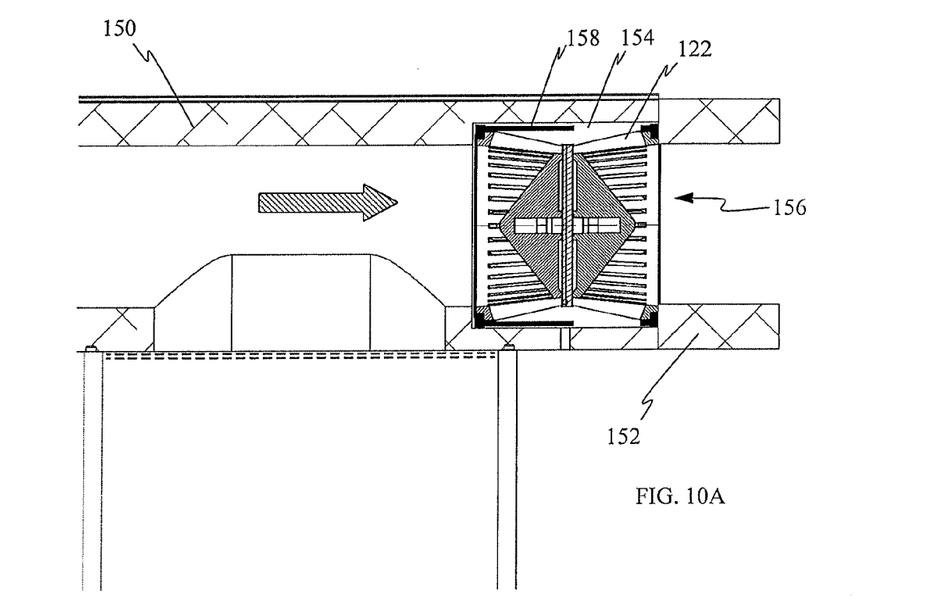
FIGS. 10A and 10B are sectional view of a portion of the apparatus of FIGS. 6 to 8.
Figure 10B:
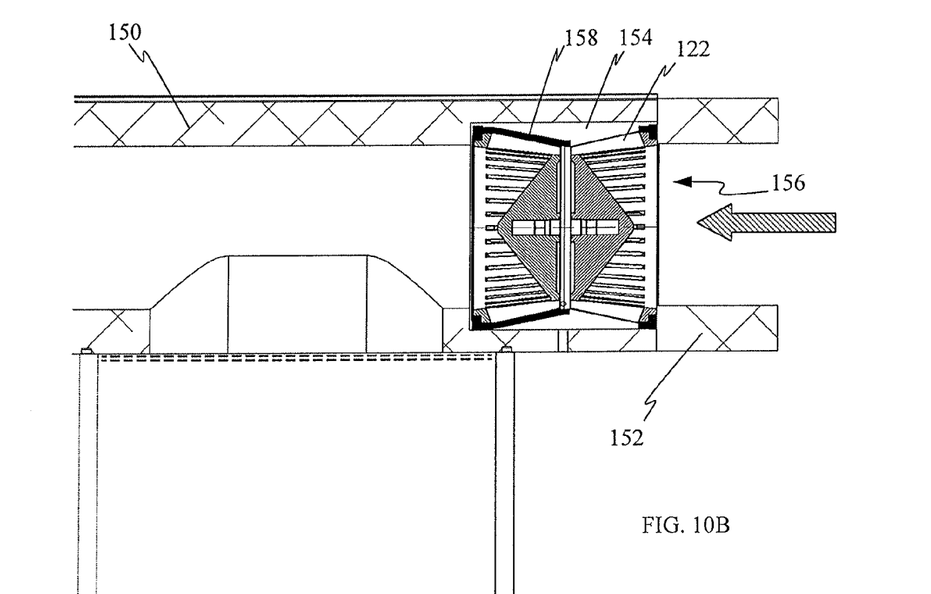

A second extrusion 150 is located above columns 104 and operates in a similar manner to extrusion 108 in order to join the multiple columns 104 together. An outlet end block 152, similar to exhaust end block 148, is located at one end of the second extrusion 150. The recesses 154 in second extrusion 150 (equivalent to recesses 110 in extrusion 108) contain valves 156. These valves 156 are formed identically to valves 118 except that the tubular membrane 158 is approximately half the length of membrane 120 thereby allowing valve 156 to act as a one-way valve. FIGS. 10A and 10B show this operation with the valve 156. In FIG. 10A the flow of air through the valve 156 is allowed as gases pass from the column through the valve by moving the membrane 158 away from engagement with support 138 and on to outlet end block 152. In contrast, in FIG. 10B air flow in the reverse direction is prevented as the flow of gases presses the shortened membrane 158, which is already in its resting position, against the apertures 130 in one of the support bodies 138. It should be noted that unlike the valves 118 in extrusion 108, there is no equivalent to the valve control inlet 116 and these valves are not controlled by separate pneumatic pressure. However, as an alternative and as used in nitrogen production systems, a valve of the type described above and referenced as 118 is used to control the flow of gases through the outlet block 152.

Figure 6:
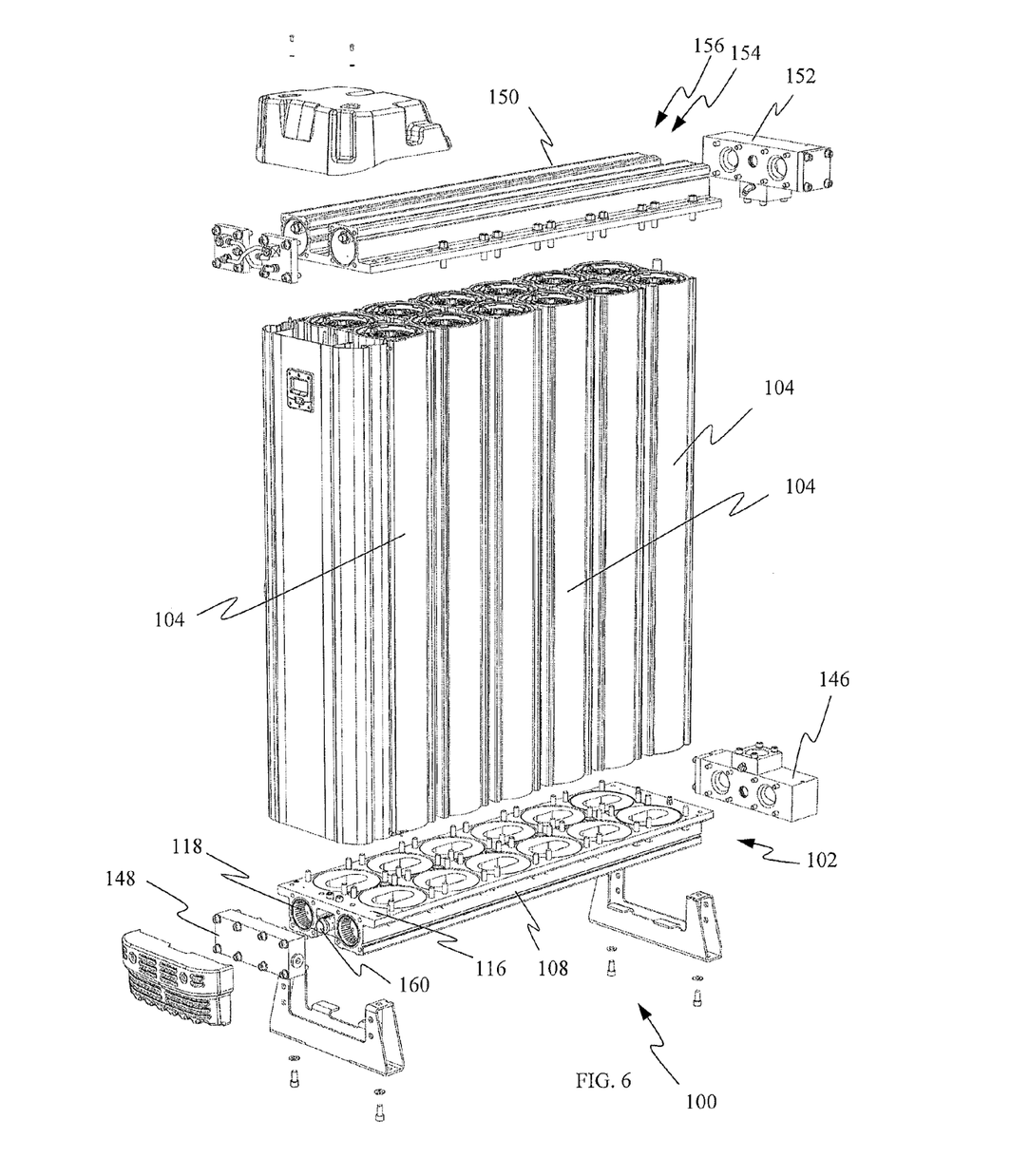
FIG. 6 is an exploded perspective view of the apparatus of FIG. 4.

Use of PSA apparatus 100 will now be described. A stream of gas, typically air, is pumped into apparatus 100 through main inlet 102. Whilst the apparatus 100 is operating, one set of columns, for example the row the columns 104 on the left hand side as seen in FIGS. 6 to 8, are in an operational state whilst the other columns 104, on the right hand side, are in a purge mode. The two valves 118 on either end of channel 106 on the operational side are arranged such that the valve that is in the recess 110 adjacent the inlet end block 146 is open and allows the flow of gas to enter channel 106 and pass into the operational columns 104. The other valve, in the recess 110 adjacent exhaust end block 148, is closed by the application of compressed air through the valve control inlet 116 in the recess 110 adjacent the exhaust end block 148. As a result, the flow of gas is prevented from exhausting from channel 106 into exhaust end block 148. Because a stream of gas is passing into column 104 an adsorption will take place on the adsorbent material contained therein. The particular adsorption that takes place depends upon the material and the processing that the apparatus 100 is designed to undertake.

The other columns 104 are operating in purge mode and as a result the valve 118 adjacent the inlet end block 146 is closed, preventing any flow of gas from entering channel 106 on that side of the apparatus 100. At the same time, the valve 118 adjacent the exhaust end block 148 is open, thereby allowing the depressurisation of columns 104 and the venting of gas through the exhaust pipe 160. The valve 156 will close, due to the decrease in pressure in the columns and the channel in the second extrusion 150 thereby preventing any loss of dry air. As a result, the purge air used to regenerate the columns 104 during the purge mode is the dry air contained within the columns and the channel in second extrusion 150. Alternatively, some of the dry or nitrogen enriched air from the operational columns are fed into the purging columns at close to atmospheric pressure to assist in the purging of the adsorbate.

The PSA apparatus 100 continues to operate in this manner for a predetermined period of time, when the operational columns begin to become saturated, with whatever their adsorbent material removes, the columns switch operation so the purged columns become operational and the operational columns begin to purge. This is achieved by the switching of the valve 118 from closed to open and vice versa.

It will be appreciated by persons skilled in the art that the above embodiments have been described by way of example only and not in any limitative sense, and that the various alterations and modifications are possible without departure from the scope of the invention as defined by the appended claims.

The invention claimed is:

1. A pressure swing adsorption apparatus for treatment of gases, the apparatus comprising:

at least one apparatus inlet for receiving a flow of gas;

at least one adsorption column containing at least one adsorption material for adsorbing at least one component of said gas passing therethrough;

at least one channel connecting at least one said apparatus inlet to at least one said adsorption column such that said flow of gas can pass from said inlet to said column, said channel having at least one recess therein and said recess having at least one recess inlet, at least one recess outlet and at least one valve control inlet; and at least one valve located between said recess inlet and said recess outlet, the valve including at least one support member having at least one aperture extending therethrough; and at least one tubular membrane substantially surrounding said support member, said membrane movable, in response to fluid pressure applied to said membrane through said valve control inlet, between a first position in which said membrane does not block said apertures of said support thereby allowing said gases to flow from said recess inlet to said recess outlet and a second position in which said membrane blocks said apertures of said support thereby preventing said gases from flowing from said recess inlet to said recess outlet.

2. An apparatus according to claim 1, wherein said adsorption material comprises at least one adsorbent for adsorbing water from said gas.

3. An apparatus according to claim 1, wherein said adsorption material comprises at least one adsorbent for adsorbing oxygen from said gas.

4. An apparatus according to claim 1 wherein said channel comprises a substantially tubular member formed by extrusion.

5. An apparatus according to claim 1 wherein said recess is machined into said channel.

6. An apparatus according to claim 1 wherein said recess is substantially annular.

7. An apparatus according to claim 1 wherein said support member comprises a pair of frustoconical members engaged with each other and said apertures in said support members extending through curved surfaces of said frustoconical members.

8. An apparatus according to claim 1 wherein said apertures are in the form of slots.

9. An apparatus according to claim 1 wherein said membrane has a thickness substantially equal to the depth of said recess relative to said channel.

* * * * *